United States Patent Office  
3,214,408  
Patented Oct. 26, 1965

3,214,408  
ETHOXYLINE RESIN COMPOSITIONS  
Joseph Rosenberg, Schenectady, N.Y., assignor to General Electric Company, a corporation of New York  
No Drawing. Filed Aug. 18, 1955, Ser. No. 529,336  
4 Claims. (Cl. 260—47)

My invention relates to new and useful resin compositions. More particularly, my invention relates to resin compositions having desirable physical, chemical and electrical properties including long pot life.

Epoxy, epoxide or ethoxyline resins, as they are variously called, are well known in the art. For example, United States Patent No. 2,324,483 to Castan discloses epoxy resin compositions comprising the reaction product of phenols having at least two phenolic hydroxy groups and an epihalogenohydrin such as epichlorohydrin, the product being cured to a thermoset mass by the use of a polycarboxylic or polybasic acid or acid anhydride such as phthalic anhydride. The resultant resinous reaction products are generally complex resins comprising a polyether derivative of the polyhydroxy phenol used and containing epoxide groups. Such resins are sold commercially under various trademarks and trade names of which Epon and Araldite are exemplary.

A shortcoming of many epoxy resin compositions is their relatively short pot life, in other words once the curing agent has been added to the basic ethoxyline composition, the resultant material tends to gel within a relatively short period of time. Such gelling requires that the compositions be used quickly and additionally detracts from the final characteristics of the resultant thermoset mass. This short pot life or gelling is caused by the fact that to secure a homogeneous mixture of ethoxyline resin material and curing agent, the mixture must be heated at least to the melting point of the curing agent sometimes for extended periods of time. Such is the case when ethoxyline resins are cured with hexachloroendomethylenetetrahydrophthalic anhydride. Ethoxyline resins so cured are described in copending patent application Serial No. 305,913, filed August 22, 1952 and assigned to the same assignee as the present application and are characterized by improved hardness and electrical qualities at high temperatures. However, their pot life is relatively short or about one-half hour. In copending patent application Serial No. 468,160, filed November 10, 1954, there are described ethoxyline resin hexachloroendomethylenetetrahydrophthalic anhydride compositions in which the hexachloroendomethylenetetrahydrophthalic anhydride is first mixed with a chlorinated phenyl compound to facilitate the dissolving of the hexachloroendomethylenetetrahydrophthalic anhydride curing agent in the resin and give a longer pot life, still suitably retaining the efficacious characteristics of a hexachloroendomethylenetetrahydrophthalic anrydride cured ethoxyline resin. While these latter compositions are useful, they require the addition of a material other than a curing agent to the resin, thus in a sense diluting it.

Although ethoxyline resins cured with phthalic anhydride and other materials such as maleic anhydride have a relatively long pot life, the fuming of anhydrides which takes place during their admixture with the resin at their melting point or higher creates a physiological hazard as well as a variable final product or at best a loss of starting material.

It is, therefore, an object of my invention to provide ethoxyline resin compositions in which the curing agent is added at relatively low temperatures with little or no loss of curing agent and without the addition of noncuring materials.

Briefly stated, may invention comprises the method and the material resulting from the admixture to ethoxyline resins of a eutectic mixture of at least two polybasic or polycarboxylic acids or acid anhydrides which are curing agents for such ethoxyline resins.

The features of my invention which I believe to be novel are set forth with particularity in the claims appended hereto. My invention, however, both as to its organization and method of operation, together with further objects and advantages thereof, may best be understood by reference to the following description.

The ethoxyline resins used in conjunction with my invention are well known in the art. They are described in Castan United States Patent Nos. 2,324,483 and 2,444,333, British Patent No. 518,057 and British Patent No. 579,698. Generally the ethoxyline resins described therein are the reaction product of an epihalogenohydrin such as epichlorohydrin and a phenol having at least two phenolic hydroxy groups such as bis-(4-hydroxy phenyl) dimethyl-methane. United States Patent Nos. 2,494,295, 2,500,600, and 2,511,913 describe further ethoxyline resins which can be used in conjunction with my invention. The above patents are hereby incorporated by reference in this application. The ethoxyline resins used herein have more than one epoxy group per molecule. They can be prepared by reacting a polyhydroxy alcohol or phenol such as hydroquinone, resorcinol, glycerine and condensation products of phenols with ketones, for example, bis-(4-hydroxy phenyl)-2,2-propane with epichlorohydrin. The reaction of epichlorohydrin with bis-(4-hydroxy phenyl)-2,2-propane is as follows:

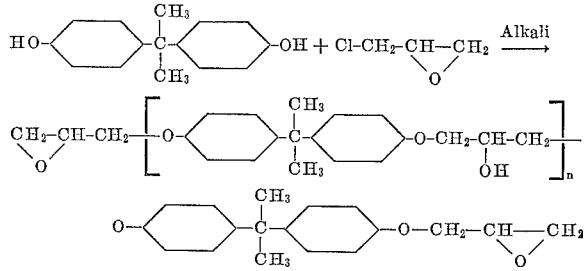

where $n$ has an average value ranging from 0 to about 7. Such ethoxyline resins are sold under the name of Epon Resins by Shell Chemical Corporation and under the name Araldite by the Ciba Company. The data given below for Epon Resins is representative.

TABLE I

| Epon No. | Epoxide Equivalent | Approximate Esterification Equivalent | M.P., ° C. |
|---|---|---|---|
| 828 | 192 | 80 | 9 |
| 834 | 225–290 | 105 | 20–28 |
| 1001 | 450–425 | 130 | 64–76 |
| 1004 | 905–985 | 175 | 97–103 |
| 1007 | 1,600–1,900 | 190 | 127–133 |
| 1009 | 2,400–4,000 | 200 | 145–155 |
| 1062 | 140–165 | | Liquid |
| 1064 | 300–375 | 105 | 40–45 |

The polybasic or polycarboxylic acids or acid anhydrides which are used in my invention are those which are capable of curing ethoxyline resins and taken alone as such some are well known. However, their use in eutectic mixtures in order to produce the lowest possible melting point and hence to permit their admixture with ethoxyline resin materials at such low temperature as to insure the longest possible pot life without the addition of foreign non-reactive material and to decrease undesirable fuming is, so far as I know new. A eutectic mixture is well known as the mixture of two or more substances which has the lowest melting point of any possible mixture of those substances. It is also well known that only a pure substance or a eutectic mixture melts sharply at a definite temperature. In the practice of my invention, the procedure of preparing ethoxyline anhydride cured ethoxyline further make evident its desirability. All measurements were taken at 60 cycles per second. The dielectric constant is favorably high and constant making it useful for capacitor insulation.

TABLE II

|  | Hardener | 25° C. | 50° C. | 75° C. | 100° C. | 125° C. | 150° C. |
|---|---|---|---|---|---|---|---|
| P.F., Percent | Hexachloroendomethylenetetrahydrophthalic Anhydride. | 0.40 | 0.17 | 0.10 | 0.09 | 0.12 | 0.21 |
|  | Phthalic Anhydride | 0.25 | 0.83 | 1.4 | 1.4 | 3.4 | 12.8 |
|  | Eutectic of Hexachloroendomethylenetetrahydrophthalic Anhydride and Phthalic Anhydride. | 0.36 | 0.37 | .53 | .65 | .90 | 1.6 |
| D.C. Resistivity, ohm-cm | Hexachloroendomethylenetetrahydrophthalic Anhydride. | $10^{15}$ | $10^{15}$ | $10^{15}$ | $10^{15}$ | $10^{15}$ | $3.3 \times 10^{15}$ |
|  | Phthalic Anhydride | $10^{16}$ | $2.7 \times 10^{15}$ | $2.0 \times 10^{15}$ | $3.5 \times 10^{14}$ | $7.8 \times 10^{13}$ | $1.6 \times 10^{12}$ |
|  | Eutectic of Hexachloroendomethylenetetrahydrophthalic Anhydride and Phthalic Anhydride. | $10^{17}$ | $10^{17}$ | $10^{17}$ | $10^{16}$ | $1.3 \times 10^{15}$ | $4.0 \times 10^{14}$ |
| Dielectric Constant | do | 4.5 | 4.5 | 4.6 | 4.5 | 4.6 | 4.7 | resin compositions is as heretofore known except that instead of using a single curing agent or even a mere mixture of curing agents, the eutectic mixture of the curing agents to be employed is used. Only by the use of the eutectic mixture may optimum advantages be realized.

The following will illustrate the practice of my invention, all materials being in parts by weight:

Example 1

The eutectic mixture of hexachloroendomethylenetetrahydrophthalic anhydride and phthalic anydride was prepared by experiment by heating phthalic anhydride to 200° C. and adding hexachloroendomethylenetetrahydrophthalic anhydride to the molten mass. It was found that the eutectic mixture of these materials melting sharply at 97° C. contains 28.5 percent by weight phthalic anhydride and 71.5 percent by weight hexachloroendomethylenetetrahydrophthalic anhydride. This eutectic mixture in the amount of 72.3 grams was added to 80.0 grams of Epon 834 with stirring at about 100° C. Rapid formation of a solution took place. When the solution was tested in a gel meter at 100° C., the gel time was found to be 63 minutes. The gel meter used in all tests described herein was a General Electric gel time meter having a motor driven paddle inserted in the resinous material, the paddle being driven at constant torque until stopped by the gelling of the mix. The gel time for the same ethoxyline resin mixed with hexachloroendomethylenetetrahydrophthalic anhydride alone was 31 minutes or less than half as long. While the gel time using phthalic anhydride alone is longer than that using my eutectic mixture, undesirable fuming occurs. When my above ethoxyline resin-eutectic curing agent mixture was cured for 16 hours at 150° C. a hard, tough resinous mass resulted which had a heat distortion point of 151° C. and was flame retardant. This compares favorably with the hexachloroendomethylenetetrahydrophthalic anhydride cured material which has a heat distortion point of 180° C. and is also flame retardant. On the other hand, the phthalic anhydride cured product had a heat distortion point of only 114° C. and burned readily when exposed to a flame.

The electrical properties shown in Table II below for my new composition as compared to hexachloroendomethylenetetrahydrophthalic anhydride and phthalic

Example 2

The eutectic mixture of pyromellitic dianhydride and phthalic anhydride was prepared by experimentation and found to consist of 14.2 percent by weight pyromellitic dianhydride and 85.8 percent by weight phthalic anhydride melting sharply at 129° C. To 88.7 grams of this eutectic mixture at just above its melting point was added 154.8 grams Epon 834 with stirring. When the quickly formed solution was tested in a General Electric gel time meter at 100° C., it gelled in 73 minutes. When the material was cured for 16 hours at 150° C. the solid resultant mass had a heat distortion point of 139° C., characteristics which again are better than for an ethoxyline resin cured with phthalic anhydride alone. While pyromellitic dianhydride is capable theoretically of curing epoxy resins alone, as a practical matter it cannot be so used because the resin gels before the pyromellitic dianhydride will dissolve in it or results in a non-homogeneous mass containing some undissolved and unreacted pyromellitic dianhydride. We thus have a case where we are enabled by my invention to take advantage in a practical sense of this material as a curing agent.

Shown in Table III below are certain of the electrical characteristics of Epon 834 cured with the eutectic mixture of pyromellitic dianhydride and phthalic anhydride. The particularly high dielectric constant which remains at a substantially steady value over the wide range of 25° C. to 125° C. makes this composition very useful as a capacitor insulation and is an unusual and unexpected property, especially in an epoxy resin composition.

TABLE III

|  | 25° C. | 50° C. | 75° C. | 100° C. | 125° C. | 150° C. |
|---|---|---|---|---|---|---|
| P.F., percent | 0.36 | .45 | .61 | .93 | 1.5 | 3.2 |
| D.C. Resistivity in ohm-cm | $10^{16}$ | $10^{16}$ | $10^{16}$ | $10^{16}$ | $7.9 \times 10^{13}$ | $2.6 \times 10^{12}$ |
| Dielectric Constant | 4.7 | 4.7 | 4.7 | 4.8 | 5.0 | 5.3 |

Example 3

The eutectic mixture of 26 percent by weight pyromellitic dianhydride and 74.0 percent by weight succinic anhydride melting sharply at 112° C. was prepared by experiment. To 80.1 grams of this eutectic mixture at just above its melting point was added 180.6 grams of Epon 834 with stirring. The resulting solution had a gel time of 42 minutes at 100° C. when tested as above. The thermoset mass resulting from a cure at 150° C. for 16 hours had a high heat distortion point of 144° C. It will be noted from Table IV below listing certain electrical properties of the resin composition of this example that it has again a high, relatively steady dielectric constant over a wide range of temperatures as well as a low, relatively constant power factor over an appreciable temperature range.

TABLE IV

|  | 25° C. | 50° C. | 75° C. | 100° C. | 125° C. | 150° C. |
|---|---|---|---|---|---|---|
| P.F., percent | 0.35 | 0.38 | 0.47 | 0.55 | 0.86 | 1.8 |
| D.C. Resistivity in ohm-cm | $10^{16}$ | $10^{16}$ | $10^{16}$ | $10^{16}$ | $8.9 \times 10^{13}$ | $1.0 \times 10^{13}$ |
| Dielectric Constant | 5.1 | 5.1 | 5.1 | 5.3 | 5.6 | 6.0 |

Example 4

The eutectic mixture of 29.0 percent by weight phthalic anhydride and 71.0 percent by weight succinic anhydride melting sharply at 96° C. was found and prepared by experiment. When 92.7 grams of this eutectic mixture was mixed with 232.2 grams Epon 834 resin at about 98° C. a solution readily resulted having a gel time at 100° C. of over 190 minutes, the test having been discontinued after that time. When cured at 150° C. for 16 hours the resultant mass had a heat distortion point of 113° C. Table V below shows certain of the electrical properties of this material.

TABLE V

|  | 25° C. | 50° C. | 75° C. | 100° C. | 125° C. | 150° C. |
|---|---|---|---|---|---|---|
| P.F., percent | 0.25 | 0.34 | 1.1 | 1.2 | 4.8 | 9.4 |
| D.C. Resistivity in ohm-cm | $10^{16}$ | $10^{16}$ | $10^{16}$ | $4.0 \times 10^{13}$ | $2.3 \times 10^{13}$ | $3.2 \times 10^{11}$ |
| Dielectric Constant | 4.8 | 4.4 | 4.8 | 5.5 | 6.1 | 6.3 |

Example 5

The eutectic mixture of succinic anhydride and azelaic acid was found to melt sharply at 103° C. and consist of 35.5 percent by weight succinic anhydride and 64.5 percent by weight azelaic acid. The gel time at 100° C., tested with a gel time meter, of a mixture of 96.3 grams of the above eutectic mixture and 180.6 grams of Epon 834 prepared at about 105° C. was over 190 minutes, the test having been discontinued after that elapse of time. When the composition was cured at 150° C. for 16 hours, a resinous mass with unique properties resulted. In the first place it is unusual to secure a void-free cast epoxy resin when using a dibasic acid as a cure agent. However, the eutectic of succinic anhydride and azelaic acid provided a completely void-free cast resin. Furthermore, the resultant material was extremely resistant to physical abuse taking an extraordinary amount of pounding and other abuse without shattering, a characteristic unusual in epoxy resins. The modulus of elasticity in bending of this material determined in accordance with ASTM D790-49T and with three specimens averaged $0.132 \times 10^6$ pounds per square inch. Typically epoxy resins have a modulus of elasticity in bending of from about $0.385 \times 10^6$ to $0.485 \times 10^6$ pounds per square inch. The material would not rupture under flexing when tested according to ASTM D790-49T. When this material was cast around a heavy bolt and repeatedly cycled between —55° C. and 100° C., no cracks or voids appeared in the cast material. Compositions using phthalic anhydride, hexachloroendomethylenetetrahydrophthalic anhydride or amines as hardening agents fail under this test. Certain of the electrical characteristics of this material are shown in Table VI as follows:

Example 6

A eutectic mixture of 27.6 percent by weight pyromellitic dianhydride, 47.4 percent by weight hexachloroendomethylenetetrahydrophthalic anhydride and 25.0 percent by weight phthalic anhydride melting sharply at 99° C. was prepared by experiment. When 64.0 grams of this eutectic and 86.0 grams of Epon 834 were mixed at about 100° C, a solution was readily formed which at 100° C. had a gel time of 44 minutes. The cured resin composition had a heat distortion point of 134° C. and was flame retardant. Table VII below shows that

TABLE VI

|  | 25° C. | 50° C. | 75° C. | 100° C. | 125° C. | 150° C. |
|---|---|---|---|---|---|---|
| P.F., percent | 0.39 | 3.3 | 3.4 | 22 | 74 | 86 |
| D.C. Resistivity in ohm-cm | $10^{16}$ | $1.2 \times 10^{14}$ | $1.3 \times 10^{12}$ | $9.2 \times 10^{10}$ | $2.0 \times 10^{10}$ | $1.1 \times 10^{10}$ |
| Dielectric Constant | 4.9 | 5.3 | 6.7 | 6.9 | 7.2 | 12 | the composition of this example also has favorable electrical characteristics and in particular a substantially constant and high dielectric constant from 25° C. to 150° C. which makes it useful for capacitor applications.

TABLE VII

|  | 25° C. | 50° C. | 75° C. | 100° C. | 125° C. | 150° C. |
|---|---|---|---|---|---|---|
| P.F., percent | 0.39 | 0.41 | 0.54 | 0.71 | 0.83 | 1.4 |
| D.C. Resistivity in ohm-cm | $10^{17}$ | $10^{17}$ | $10^{17}$ | $10^{17}$ | $2 \times 10^{16}$ | $4.2 \times 10^{15}$ |
| Dielectric Constant | 4.7 | 4.7 | 4.7 | 4.7 | 4.9 | 4.8 |

Example 7

A eutectic mixture of 18.7 percent by weight hexachloroendomethylenetetrahydrophthalic anhydride, 60.0 percent by weight azelaic acid and 21.3 percent by weight succinic anhydride melting sharply at 98° C. was found experimentally. When 94.3 grams of this eutectic mixture was added to 154.8 grams of Epon 834 at about 100° C. a solution readily formed which at 100° C. had not gelled when tested as above after 190 minutes. Azelaic acid taken alone as an ethoxyline resin curing agent or hardener produces a rubbery material. After curing at 150° C. for 16 hours the resultant thermoset mass had the following electrical characteristics:

TABLE VIII

|  | 25° C. | 50° C. | 75° C. | 100° C. | 125° C. | 150° C. |
|---|---|---|---|---|---|---|
| P.F., percent | 0.24 | 0.82 | 0.56 | 4.1 | 31 | 73 |
| D.C. Resistivity in ohm-cm | $10^{15}$ | $2 \times 10^{14}$ | $2.5 \times 10^{11}$ | $5.0 \times 10^{9}$ | $6.1 \times 10^{8}$ | $2.5 \times 10^{8}$ |
| Dielectric Constant | 4.4 | 4.6 | 5.7 | 6.5 | 6.3 | 6.9 |

Other eutectic mixtures of acids and acid anhydrides which are curing agents for epoxide type resins will occur to those skilled in the art such, for example, as the eutectic mixture of 29.5 percent by weight hexachloroendomethylenetetrahydrophthalic anhydride and 70.5 percent by weight maleic anhydride which melts at 55° C.; the eutectic mixture of 14.3 percent by weight phthalic anhydride and 85.7 percent maleic anhydride melting at 49° C.; the eutectic mixture of 33 percent by weight hexachloroendomethylenetetrahydrophthalic anhydride and 67 percent by weight azelaic acid melting at 103° C. and the eutectic mixture of 8 percent by weight phthalic anhydride and 92 percent by weight azelaic acid melting at 101° C.

As to the curing of my resin mixtures, it will be realized that such a process is essentially one of time and temperature. Thus our resin-curing agent compositions can be conveniently cured at higher temperatures of up to about 200° C. for shorter times than 16 hours or at lower temperatures than the 150° C. used in the examples for longer times.

My new materials may be used in the as-cast condition. They can also be used for molding or in coating or impregnating textile or glass type, acetone and other well known polar solvents being used to dissolve the materials. They can also be used to coat metals, and prepare laminates and adhesives. Filler materials can also be added to the resinous material such as silica, asbestos, clay, carbon, graphite, glass powder or fiber, magnetic material and the like. Many other uses of such resin compositions will occur to those skilled in the art.

What I claim as new and desire to secure by Letters Patent of the United States is:

1. A composition of matter comprising a glycidyl polyhydric organic compound, said compound being selected from the group consisting of polyhydric alcohols and polyhydric phenols and a curing agent therefor, said curing agent consisting of the eutectic mixture of pyromellitic dianhydride and succinic anhydride.

2. A composition of matter comprising a glycidyl polyether of a polyhydric organic compound, said compound being selected from the group consisting of polyhydric alcohols and polyhydric phenols and a curing agent therefor, said curing agent consisting of the eutectic mixture of pyromellitic dianhydride and phthalic anhydride.

3. A composition of matter comprising a glycidyl polyether of a polyhydric organic compound, said compound being selected from the group consisting of polyhydric alcohols and polyhydric phenols and a curing agent therefor, said curing agent consisting of the eutectic mixture of pyromellitic dianhydride, hexachloroendomethylenetetrahydrophthalic anhydride and phthalic anhydride.

4. A composition of matter comprising a glycidyl polyether of a polyhydric organic compound, said compound being selected from the group consisting of polyhydric alcohols and polyhydric phenols and a curing agent therefor, said curing agent consisting of the eutectic mixture of pyromellitic dianhydride and a material selected from the group consisting of (1) phthalic anhydride, (2) hexachloroendomethylenetetrahydrophthalic anhydride and phthalic anhydride, and (3) succinic anhydride.

References Cited by the Examiner

UNITED STATES PATENTS

| 2,744,845 | 5/56 | Rudoff | 260—4 |
| 2,801,229 | 7/57 | De Hoff et al. | 260—47 |
| 2,948,705 | 8/60 | Robinson | 260—47 |
| 3,118,858 | 1/64 | Frey et al. | 260—47 |

OTHER REFERENCES

Dearborn et al. (2): Ind. and Eng. Chem., Vol. 45, pp. 2715–2721, 1953.

Dearborn et al. (1): Journ. of Polymer Sci., Vol. XVI, pp. 201–208, 1955.

Charlton: Modern Plastics, Vol. 32, No. 1, September 1954, pp. 155–161 and 240–243.

WILLIAM H. SHORT, *Primary Examiner.*

MILTON STERMAN, B. MANGAN, HAROLD N. BURSTEIN, JOSEPH R. LIBERMAN, *Examiners.*

UNITED STATES PATENT OFFICE
CERTIFICATE OF CORRECTION

Patent No. 3,214,408　　　　　　　　　　　　　　　October 26, 1965

Joseph Rosenberg

It is hereby certified that error appears in the above numbered patent requiring correction and that the said Letters Patent should read as corrected below.

Column 7, line 48, after "glycidyl" insert -- polyether of a --.

Signed and sealed this 21st day of June 1966.

(SEAL)
Attest:

ERNEST W. SWIDER
Attesting Officer

EDWARD J. BRENNER
Commissioner of Patents